No. 833,409. PATENTED OCT. 16, 1906.
W. J. McGUIRE.
NUT LOCK.
APPLICATION FILED JULY 3, 1906.
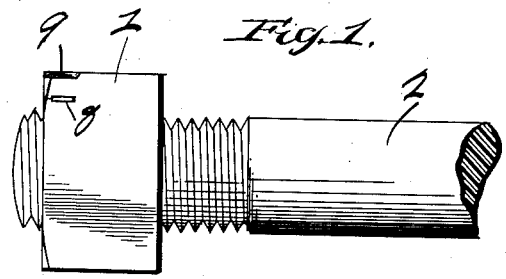
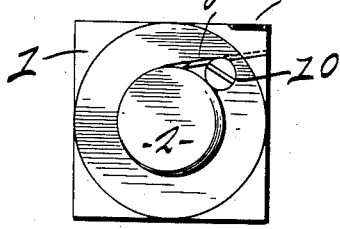
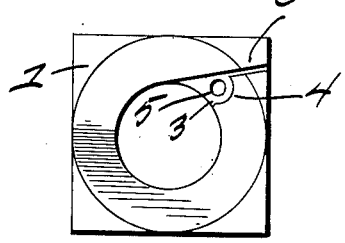
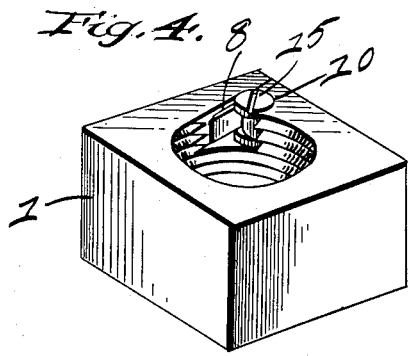
Witnesses.
Chas. O. Defenbaugh.
F. M. Brur.
Inventor:
William J. McGuire
By Chas. W. Keller.
Atty.

UNITED STATES PATENT OFFICE.

WILLIAM J. McGUIRE, OF TOLEDO, OHIO, ASSIGNOR OF ONE-HALF TO JAMES E. PILLIOD, OF TOLEDO, OHIO.

NUT-LOCK.

No. 833,409.　　　　Specification of Letters Patent.　　　　Patented Oct. 16, 1906.

Application filed July 3, 1906. Serial No. 324,550.

*To all whom it may concern:*

Be it known that I, WILLIAM J. McGUIRE, of Toledo, county of Lucas, and State of Ohio, have invented certain new and useful Improvements in Nut-Locks; and I do hereby declare that the following is a full, clear, and exact description of the invention, which will enable others skilled in the art to which it appertains to make and use the same, reference being had to the accompanying drawings, and to the figures of reference marked thereon, which form part of this specification.

This invention has reference to an improvement in nut-locks; and it has for its object to provide simple, inexpensive, and effective means for preventing the removal of a nut from its bolt, except when such removal may be desired.

The invention is especially useful upon mechanisms and devices where there is excessive vibration and from which it may be desirable to remove a nut conveniently when the occasion demands.

In carrying out my invention I employ the novel combination, arrangement, and details of construction hereinafter shown, described, and specifically pointed out in the appended claims.

In the accompanying drawings, illustrative of my invention, Figure 1 is an elevation of a nut equipped with my improved locking means, the same being in position upon the screw-threaded shank of a bolt. Fig. 2 is a face view of the same. Fig. 3 is a face view of the nut as it appears after being struck to provide the recess and slot therein. Fig. 4 is a perspective view of the complete nut with the locking parts in position. Fig. 5 is a detached view of the recessed locking-dog.

Referring to the details, 1 indicates the nut adapted to be screwed upon the shank of a bolt 2. Provided in the face of the nut by striking with a suitable die is a recess 3, having the cylindrical side wall 4, and 5 is a perforation in the floor of the recess concentric to the wall 4. 6 is a narrow slot also extending into the face of the nut and preferably formed simultaneously with the recess 3, with which it connects, being positioned at a tangent to the screw-threaded hole 7 through the bolt.

8 is a spring-pawl having one end firmly secured between the walls of the slot 6 by striking the margin of the nut at 9, and the free end is ground to an edge to spring against and engage the threads of the bolt when the nut is in position to be locked.

Rotatable within the recess 3 is a cylindrical locking-dog 10, having a reduced extension 11, pivoted in the perforation 5, and the dog is also provided with a cam-face or depression 12, into which the pawl springs to permit the free end thereof to engage the threads of the bolt. The portions 13 and 14 of the dog provide shoulders on opposite sides of the spring-pawl when the parts are assembled, so that the pawl after being secured in the slot 6 will hold the dog in position and prevent its accidental disengagement from the nut through vibration or other causes. The outer face of the dog is preferably slotted, as at 15, to permit of its being operated by means of an ordinary screwdriver, a partial rotation of the dog forcing the free end of the pawl into or out of engagement with the threads of the bolt, as may be desired, to lock or unlock the nut. The locking-dog when in position within the recess 3 is readily rotated and is firmly supported against tilting by reason of the contact of its cylindrical sides with the cylindrical wall of the recess.

When assembled, the locking parts are incapable of becoming dislodged under ordinary usage and the nut will be effectively locked upon the bolt, its removal when desired being readily accomplished.

Having described my invention, what I claim, and desire to secure by Letters Patent, is—

1. A nut provided with a recess in its face having a cylindrical side bearing-wall, said nut also provided with a slot disposed at a tangent to the bolt-hole therethrough, a spring-pawl secured at one end within the slot, and a cylindrical locking-dog rotatable in the recess in the nut and bearing against the cylindrical wall of said recess, said dog having a cam-face to engage the pawl and having shoulders disposed on opposite sides of the pawl, substantially as described.

2. A nut provided with a recess in its face having a cylindrical side wall and a perforation in the floor of the recess concentric to the cylindrical wall thereof, said nut also provided with a slot disposed at a tangent to the bolt-hole therethrough, a spring-pawl secured at one end in the slot, and a rotatable locking-dog disposed in the recess in the face of the nut and bearing against the cylindrical wall thereof, said dog having a reduced extension pivoted in the perforation in the floor of the recess and provided with a cam-face to engage the pawl, and shoulders on the dog disposed at the sides of the pawl, substantially as described.

In testimony that I claim the foregoing as my own I affix my signature in presence of two witnesses.

WILLIAM J. McGUIRE.

Witnesses:
  CARL H. KELLER,
  ARTHUR J. DARTON.